(12) United States Patent
Steins

(10) Patent No.: US 8,146,941 B2
(45) Date of Patent: Apr. 3, 2012

(54) COLLAPSIBLE TRAILER

(76) Inventor: Karl M. Steins, San Diego, CA (US)

(*) Notice: Subject to any disclaimer, the term of this patent is extended or adjusted under 35 U.S.C. 154(b) by 1751 days.

(21) Appl. No.: 11/300,006

(22) Filed: Dec. 13, 2005

(65) Prior Publication Data

US 2006/0091646 A1 May 4, 2006

Related U.S. Application Data

(63) Continuation-in-part of application No. 10/150,601, filed on May 17, 2002, now abandoned.

(51) Int. Cl.
 *B62D 63/06* (2006.01)
 *B60D 1/155* (2006.01)
 *B60D 1/54* (2006.01)

(52) U.S. Cl. ........ 280/656; 280/789; 280/418; 280/401; 280/462; 280/482; 280/491.2; 14/71.1

(58) Field of Classification Search .................. 280/656, 280/789, 402, 415.1, 416, 418, 401, 462, 280/482, 491.2, 40, 79.7, 414.1, 491.3, 43.16, 280/64; 14/71.1; 296/61, 62; 414/537
See application file for complete search history.

(56) References Cited

U.S. PATENT DOCUMENTS

| | | | | |
|---|---|---|---|---|
| 1,385,177 A * | 7/1921 | Lee | ............................. | 280/423.1 |
| 4,128,258 A * | 12/1978 | Johnson | ........................ | 280/656 |
| 4,671,530 A * | 6/1987 | van der Wouden | ........... | 280/656 |
| 4,758,008 A * | 7/1988 | Moddejonge | ................... | 280/37 |
| 4,995,129 A * | 2/1991 | Comardo | ....................... | 14/71.1 |
| 5,282,692 A * | 2/1994 | McLeod | ......................... | 404/35 |
| 5,340,134 A * | 8/1994 | Dodson | ............................ | 280/37 |
| 5,387,001 A * | 2/1995 | Hull et al. | .................... | 280/402 |
| 5,480,180 A * | 1/1996 | Fuller et al. | ................... | 280/656 |
| 5,570,898 A * | 11/1996 | Albert | ........................... | 280/656 |
| 5,607,176 A * | 3/1997 | Leib et al. | ..................... | 280/656 |
| 6,164,897 A * | 12/2000 | Edwards | ...................... | 414/537 |
| 6,378,893 B1 * | 4/2002 | Jager | ............................. | 280/656 |
| 6,428,035 B1 * | 8/2002 | Maxwell et al. | .............. | 280/656 |
| 6,511,092 B1 * | 1/2003 | Chepa | ........................... | 280/656 |
| 6,585,285 B2 * | 7/2003 | Koch | ............................. | 280/656 |
| 6,962,370 B2 * | 11/2005 | Simpson | ...................... | 280/789 |
| 2003/0062707 A1 * | 4/2003 | Koch | ............................ | 280/401 |
| 2003/0155748 A1 * | 8/2003 | Picard et al. | ................. | 280/656 |
| 2003/0193156 A1 * | 10/2003 | Norris | ............................ | 280/204 |
| 2003/0214117 A1 * | 11/2003 | Steins et al. | .................. | 280/656 |
| 2003/0218316 A1 * | 11/2003 | Simpson | ....................... | 280/656 |
| 2005/0093273 A1 * | 5/2005 | McDonell | ..................... | 280/656 |

* cited by examiner

*Primary Examiner* — John R Olszewski

(57) ABSTRACT

A Collapsible Trailer is disclosed. Also disclosed is a trailer that is lightweight, but durable, and includes a set of detachable deck segments that can be assembled into a deck. The trailer further includes a suspension assembly that attaches to the deck once the deck is assembled or, alternatively, is permanently attached to one deck segment. The horizontal intra-deck segment support is provided by slidable rods that are extendable to bridge the intersection between a pair of adjacent segments. Each deck segment has a male edge and a female edge; the male edge can be inserted into the female edge to create an interlocking hinge-like structure to provide longitudinal stability along the special plane of the assembled deck. Furthermore, the deck and trailer can be assembled without the need for any tools or additional equipment. In all cases, the deck segments, when disassembled, stackable into a condensed deck stack.

20 Claims, 6 Drawing Sheets

US 8,146,941 B2

COLLAPSIBLE TRAILER

This application is a continuation-in-art of application Ser. No. 10/150,601, filed May 17, 2002 now abandoned.

BACKGROUND OF THE INVENTION

1. Field of the Invention

This invention relates generally to cargo hauling and, more specifically, to a Collapsible Trailer.

2. Description of Related Art

Cars and trucks have become a mainstay of the modern active lifestyle. Unfortunately, due to garaging space limitations, each family is only realistically capable of having two vehicles in any single household. As a result of this, each household must make a choice as to what species of vehicle to obtain, depending upon their particular needs and circumstances. In recent years, that choice has been the Sport Utility Vehicle or SUV's. While the SUV certainly has attempted to "bridge the gap" between the utility vehicle and the passenger vehicle, it has almost gone too far. Certainly, all SUV's have the capability and design to haul a substantial amount of cargo; the problem is that they are many times too nice for this application. As a result, the user must rent or borrow.

SUMMARY OF THE INVENTION

In light of the aforementioned problems associated with the prior devices, it is an object of the present invention to provide a Collapsible Trailer. The trailer should be durable, and include a set of detachable deck segments that can be assembled into a deck. The trailer further should have a suspension assembly that attaches to the deck once the deck is assembled or, alternatively, is permanently attached to one deck segment. The horizontal intra-deck segment support should be provided by slidable rods that would be extendable to bridge the intersection between a pair of adjacent segments. Each deck segment should have a male edge and a female edge; the male edge can be insertable into the female edge to create an interlocking hinge-like structure to provide longitudinal stability along the special plane of the assembled deck. Furthermore, the deck and trailer should be able to be assembled without the need for any tools or additional equipment. In all cases, the deck segments, when disassembled, should be stackable into a condensed deck stack.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Collapsible Trailer.

The contents of the parent application to the instant application Ser. No. 10/150,601, is incorporated by reference.

Figure 1:
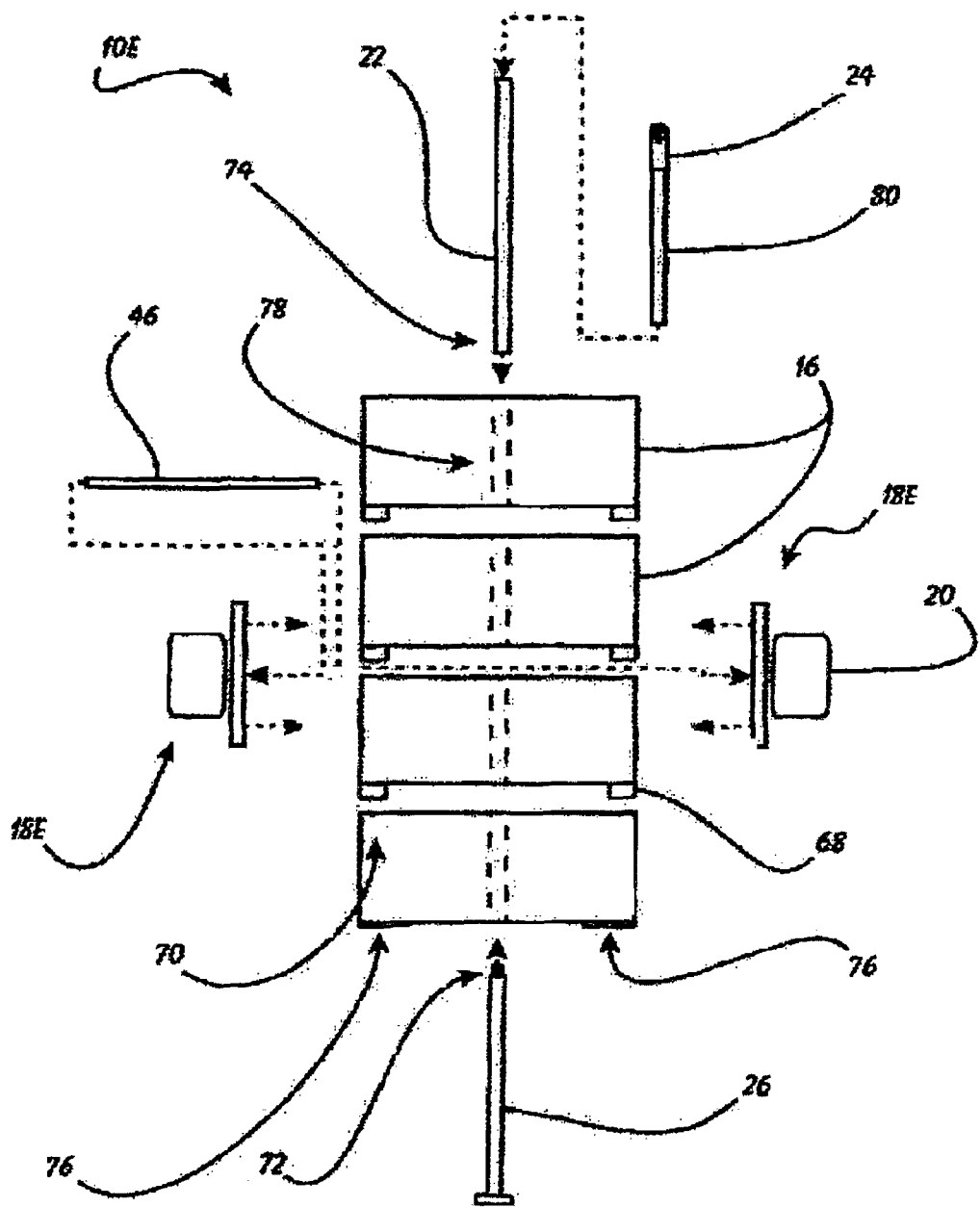
FIG. 1 is an exploded top view of a sixth embodiment of the collapsible trailer of the parent application to the instant invention.

The present invention can best be understood by initial consideration of FIG. 1. FIG. 1 is a perspective view of a sixth preferred embodiment of the present invention.

This trailer embodiment 10E comprises four or more deck segments 16A formed substantially from aluminum, plastic or other high-strength, lightweight material. Some of the deck segments 16 in this embodiment further include a system of interlocking protrusions and sockets, namely, a pair of pegs 68 extending from one side of the segment, and a cooperatively designed pair of sockets 70 on the facing side of the adjacent segment 16, such that when the deck is assembled, the pegs 68 fit into the sockets 70 to prevent twisting of the assembled deck (and to provide generally greater strength).

The segments 16 are further defined by a center bore 78 down their length; this bore 78 is provided to accept the frame members to be discussed further below (i.e. the frame members are actually inserted into the deck segments). The frame in this embodiment 10E comprises a first longitudinal strut 22, a second longitudinal strut 26 and a hitch strut 80. The hitch strut 80 terminates at its front end in the hitch socket 24, and is designed to interlock with the first longitudinal strut 22 at its rear end. The first longitudinal strut 22 is essentially a hollow tube having a substantially round cross-section, and terminating in an engaging socket 74. The engaging socket 74 is preferably a female threaded bore configured to accept an engaging peg 72 formed in the front end of the second longitudinal strut 26. The engaging peg 72 is preferably a male threaded peg for engaging the engaging socket 74. It should be understood that the peg 72 and socket 74 could be reversed (i.e. such that the socket 74 is formed in the second longitudinal strut 26).

To assemble the trailer 10E, therefore, one need simply assemble the segments such that the pegs 68 engage the sockets 70; insert the first and second longitudinal struts 22 and 26 into the (now-aligned) bores 78 and threadedly engage them tightly; attach the hitch strut 80 to the first longitudinal strut 22; and attach the suspension halves 18E and axle 46 to the assembled deck. The suspension halves 18E preferably attach to the sides of the center two segments 16; the axle 46 is attached between the two suspension halves 18E (typically prior to the attachment of the halves 18E to the deck). The order of assembly discussed herein is exemplary only; a number of factors may determine that other orders of assembly (and disassembly) of the trailer 10E are used.

Also shown in this FIG. 17 are two tail light assemblies 76 displayed on the rear surface of the rear segment 16; these tail light assemblies 76 are preferably of the type that are very sleek in order to reduce their interference with the stacking of the segments 16 (when the trailer is disassembled).

While the trailer of FIG. 1 is extremely useful and durable (and, of course, collapsible), it can tend to be very challenging to assemble and disassemble. The cause of this is gauge of metal necessary for the structural members (the large longitudinal struts 22, 24 and 26). In order to eliminate these drawbacks, a seventh embodiment of the collapsible trailer of the present invention has been devised, and is depicted in FIG. 2.

Figure 2:
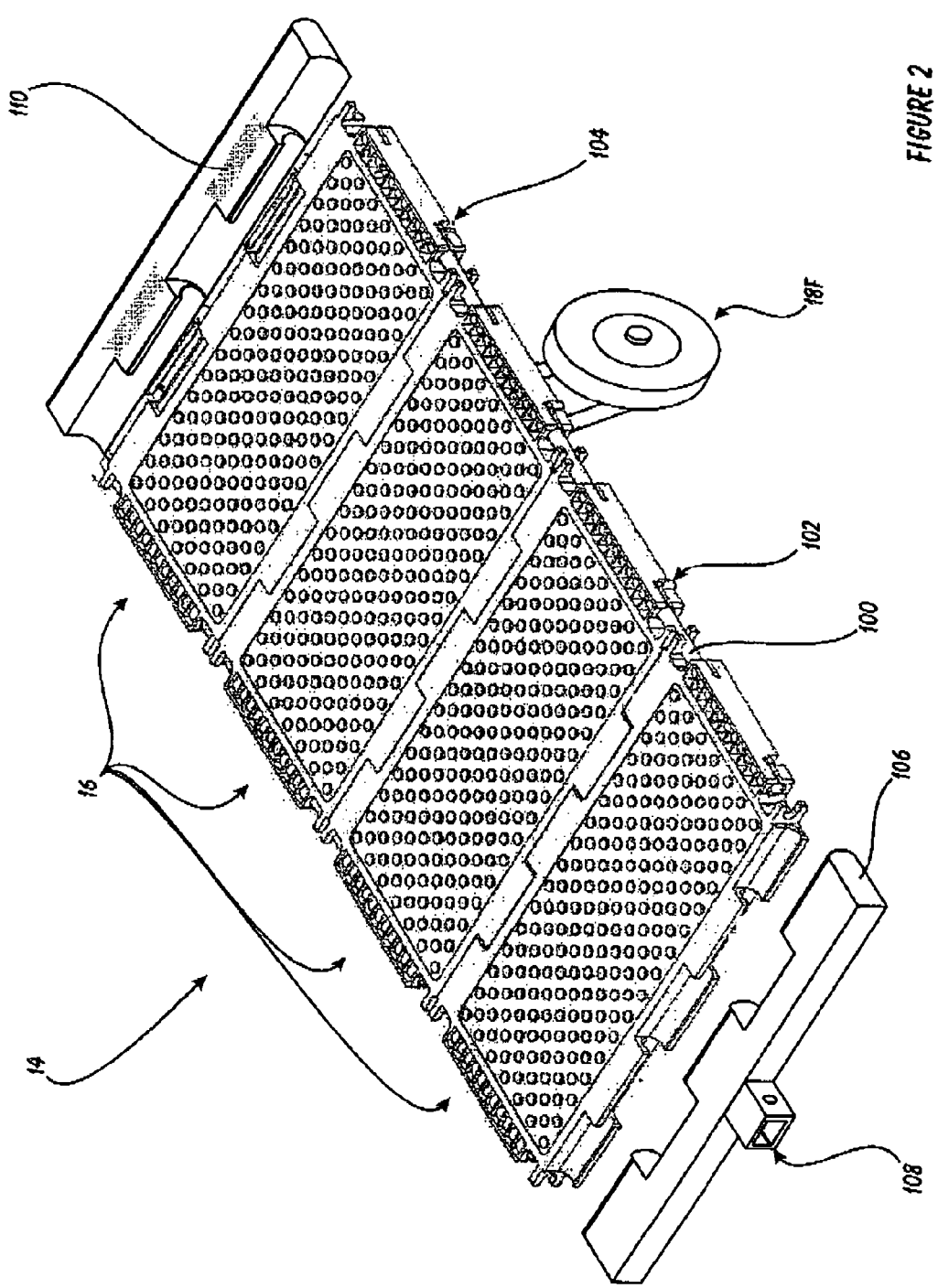
FIG. 2 is a partially exploded perspective view of a seventh embodiment of the collapsible trailer of the present invention.

FIG. 2 is a partially exploded perspective view of a seventh embodiment of the collapsible trailer 14 of the present invention. Like its predecessors, this trailer 14 is composed of a plurality of deck segments 16 made from aluminum, plastic, or some combination of these or other durable and lightweight materials. Unlike most of its predecessors, this trailer 14 does not employ large structural members for load bearing. In this version, deck segments interlock with one another (the interlocked panels resist pulling apart), and then a pair of slidable rods 100 is slid from one segment and partially into the adjacent segment so that each rod 100 bridges the intersection between a pair of interlocked adjacent panels—one rod 100 is at each outer edge of each deck segment 16 (except for one of the two end segments).

Once a rod 100 has been slid into its "bridging" position, the actuating handle 102 (which is what the user grasps to slide the rod 100), can be flipped down (rotated downwardly) until it is recessed into the handle pocket 104. Being fitted into (and possibly clipped into) the handle pocket 104 will prevent the actuating handle 102 from moving and/or permitting the rod 100 to move out of its bridging position between the two panels. A segment 16 and its two rods 100 (and associated minor parts, if appropriate) comprise a "segment assembly" for future reference.

The leading edge of the trailer deck 14 (where the trailer 10F attaches to the vehicle for towing) has a hitch adapter 106. The hitch adapter 106 interfaces with the first segment in the deck 14 by interlocking like any other segment 16 to the first segment 16. This provides a finished look for the front of the trailer 10F while making efficient use of the interlocking structure of the deck panels.

The hitch adapter 106 may be either permanently bolted to the first deck segment (thereby creating a dedicated leading edge deck segment), or it might be detachable like any other deck segment 16. The hitch adapter 106 has a receiver socket 108 extending forwardly. Like a receiver socket commonly used to mount a trailer hitch to the vehicle, the receiver socket 108 is used to mount a hitch strut, such as element 80 in FIG. 1 to the socket 108. The hitch strut 80 is detachable to provide a very compact, conveniently stowed assembly.

A lighting adapter 110 is permanently or removably attached to the last segment 16 in the deck 14. It has an edge configured to interface with the trailing edge of the last segment in the deck 14. There are conventional trailer lights (stop, turn signal) lamps housed within the adapter 110 to provide the necessary safety lighting. The wiring for the lighting adapter is contained within individual segments 16. As the segments 16 are assembled into a deck 14, the wiring from one segment 16 is connected to the adjacent segment 16, either by manually plugging them into each other, or through contact switches.

A suspension assembly 18F is attached to one deck segment 16, usually with permanent fasteners. The assembly 18F, however, is intended to be added to a typical deck segment (thereby converting that segment into a suspension segment). The suspension assembly 18F will most preferably have wheels that fold towards the center of the suspension segment when storing the trailer 10F in detached segments. Although not shown in this diagram, there will also very likely be a fender for each wheel to prevent the tires from throwing rocks up into following vehicles.

In order to make the most efficient use of the deck segment mold (the most likely manufacturing approach), a single deck segment 16 could be cut into two pieces. The result would be two half-segments (one with a male edge and one with a female edge). These two half-segments could be used to create the hitch adapter 106 and lighting adapter 110. Now turning to FIG. 3, we can examine additional specific design features of the segment 16 of this new trailer embodiment.

Figure 3:
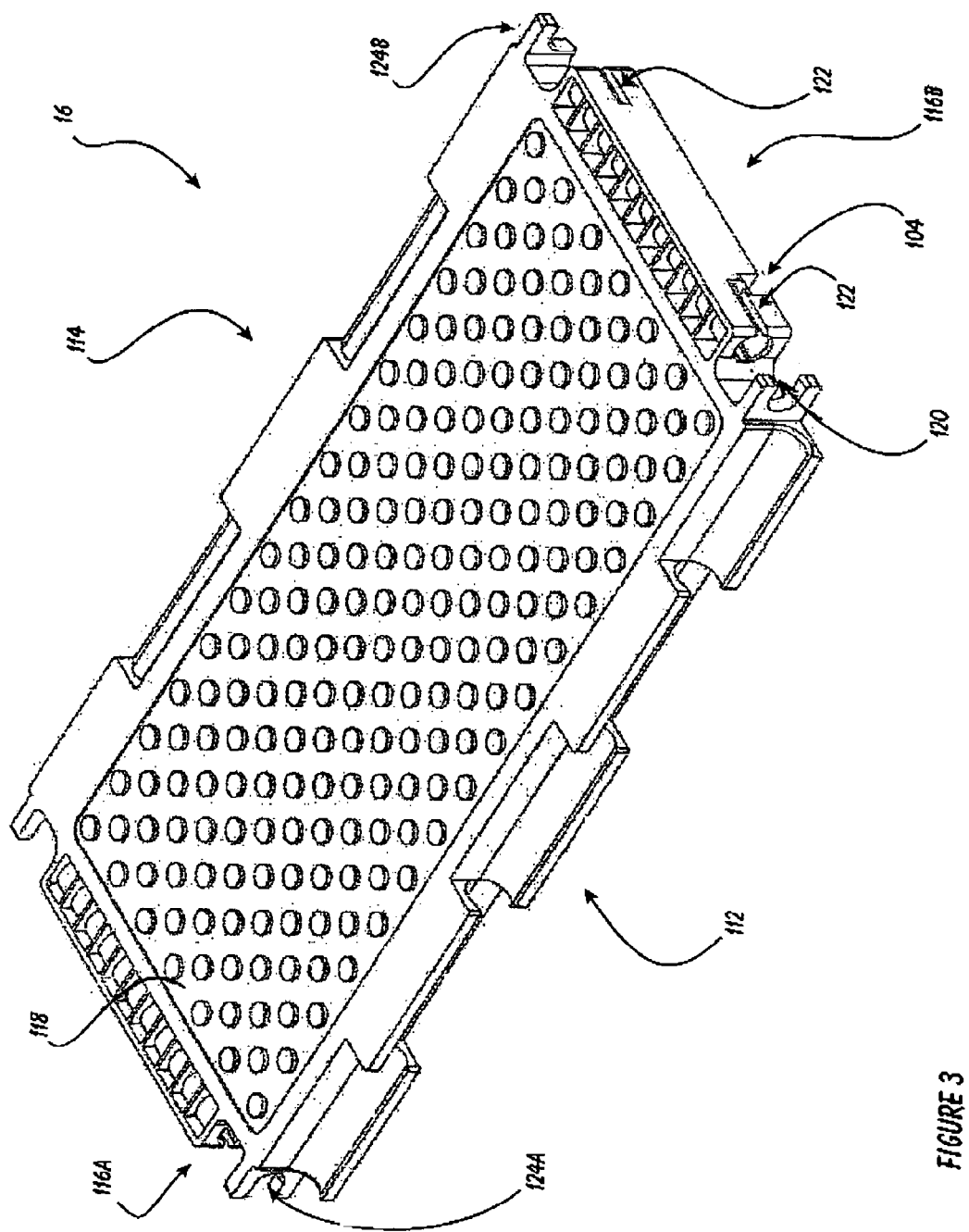
FIG. 3 is a perspective view of a deck segment of the trailer of FIG. 2.

FIG. 3 is a perspective view of a deck segment 16 of the trailer 10F of FIG. 2. In its preferred form, the segments 16 will be molded from a durable material, such as plastic or fiber-reinforced plastic. Should additional strength be necessary, metal structure may be encased within the plastic molded part as well.

The segment 16 is defined by a female edge 112 and a male edge 114 opposite thereto. The edges 112, 114 are specifically designed to interlock with one another to form a structure that looks somewhat like a hinge. When interlocked to an adjacent segment 16, this "hinge" structure will prevent the segments 16 from being pulled apart. Additional detail regarding the hinge will be provided below in connection with FIGS. 6A and 6B.

The two side edges 116A and 116B include very important structure. The side edge 116A and 116B (generically 116) configuration and associated elements is what gives the segment assembly its rigidity and load-bearing strength at the intersection between two segment assemblies. There is a rod bore 120 aligned longitudinally along each side edge 116. The bore 120 permits the slidable rod 100 to be slid along its length to engage or disengage the adjacent segment when assembling or disassembling the trailer.

Figure 4A:
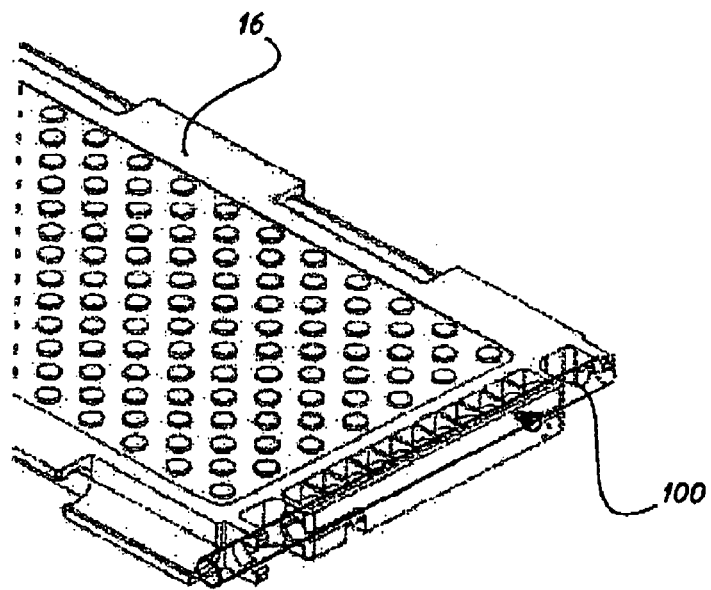
FIGS. 4A and 4B are partial perspective views of the deck segment of FIGS. 2 and 3.
Figure 4B:
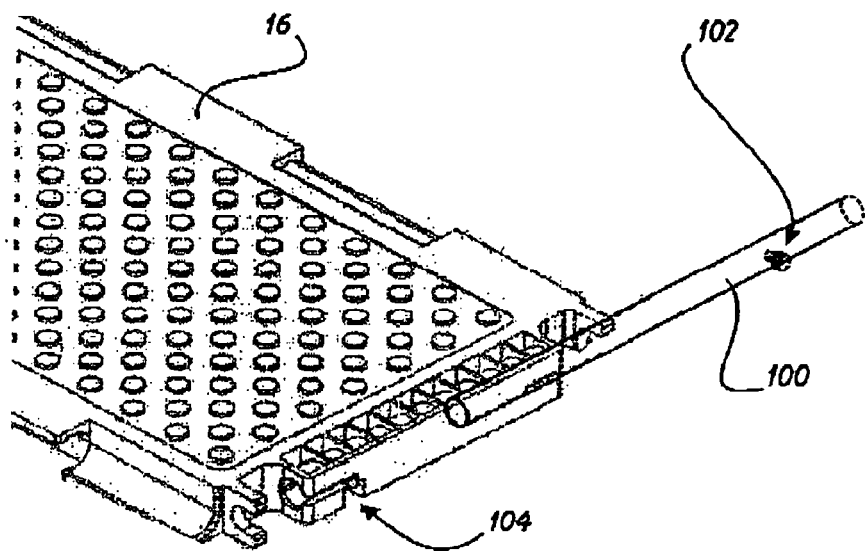

In order to provide additional rigidity to the assembled trailer, bore braces 124A and 124B (generically 124) are provided to extend outwardly from each side edge 116. As should be apparent (and visible in FIG. 2), the slidable bolt will be exposed in the gap between the bore braces 124 and the rod bore 120. These exposed portions of slidable bolt will provide the user with ideal tie-down locations for securing loads to the assembled trailer. FIGS. 4A and 4B provide additional resolution to the functioning of the slidable bolt.

FIGS. 4A and 4B are partial perspective views of the deck segment 16 of FIGS. 2 and 3. In each figure, the slidable rod 100 is shown in hidden lines so that its unique functionality can be clearly understood. As shown in FIG. 4A, when the segments 16 are in storage (disassembled from the trailer), the slidable rod 100 will be found in the "stowed" position. In its stowed position, the entire length of the rod 100 resides within the confines of the longitudinal length of the segment 16. This makes for a very compact, simple structure that is easily handled, even by the most inexperienced user.

FIG. 4B depicts the panel assembly with the slidable rod 100 in the "extended" position. When in the extended position, the rod 100 bridges the intersection between adjacent segments 16, reaching midway between each segment 16. Referencing FIG. 2, it becomes clear that a sort of "domino effect" occurs with the actuation of these rods 100. As segments 16 are interconnected to one another and their rods 100 are slid to bridge the intersection, each subsequent segment's bolt will be slid until it reaches the bolt from the adjacent segment. As a result, all of the bolts are prevented from being disengaged from the extended position by the bolt right next to it in line. This "domino effect" provides structural security to the assembled trailer by making it virtually impossible for the trailer to become disassembled. Furthermore, when fully extended, the rods 100 are rotated so that the actuating handles 102 are captured within the handle pocket 104 of the adjacent segment 16. Once captured within the pockets 104, the actuating handles 102 provide additional resistance to the assembled deck pulling apart.

Figure 5:
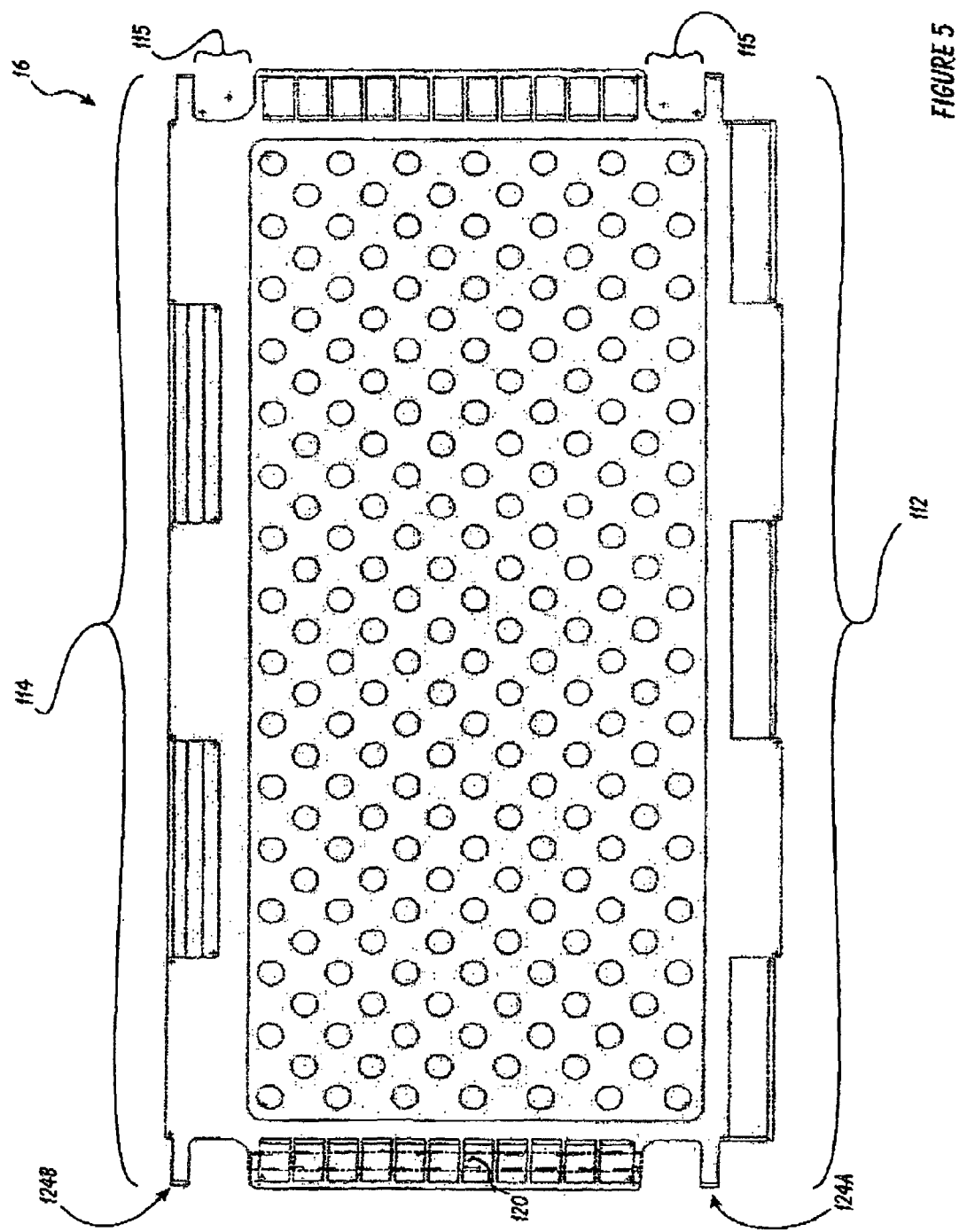
FIG. 5 is a top view of the deck segment of FIGS. 2-4.

FIG. 5 is a top view of the deck segment 16 of FIGS. 2-4. As shown, the female edge 112 runs across virtually the entire transverse with of the segment 16. Similarly, the male edge 114 runs across virtually the identical width of the opposing edge of the segment 16. These two edges 112, 114 are configured so that one segment 16 interlocks with another segment 16.

The top surface of the segment may have the raised "dimples" shown here, or some other design that provides traction, skid-resistance and conceals scrapes and scratches. On the side edges, there are gaps 115 in between the portion of the segment 16 housing the rod bore 120, and the two bore braces 124A and 124B. As discussed above, the rod is exposed within these gaps 115 to provide locations for tying cargo down to the trailer (or to assist in securely storing the segments). Finally turning to FIGS. 6A and 6B, we can examine the unique interlocking design of these segments 16.

Figure 6A:
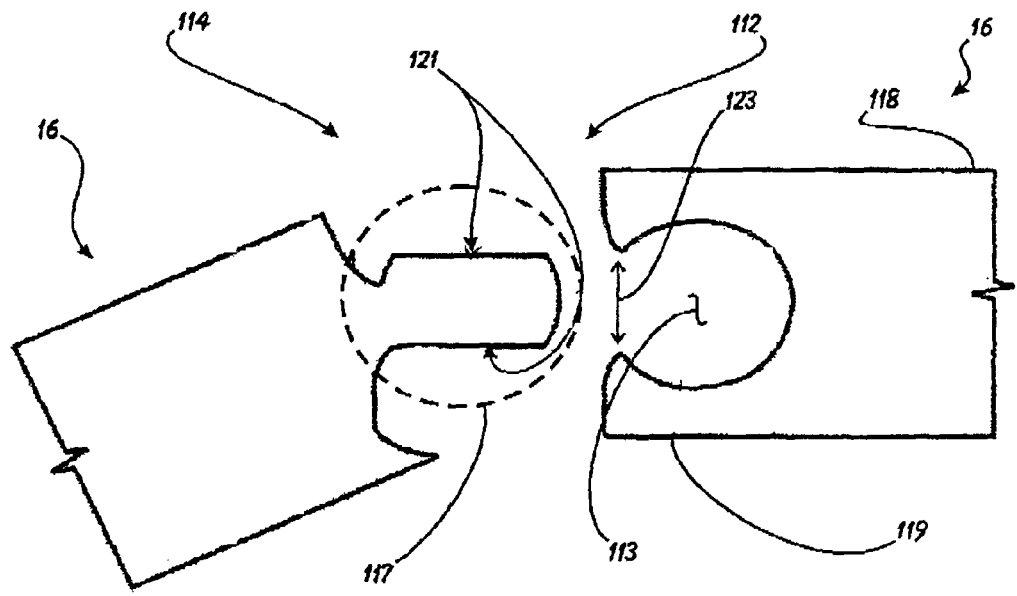
FIGS. 6A and 6B are cutaway side views of the deck segments of FIGS. 2-5.
Figure 6B:
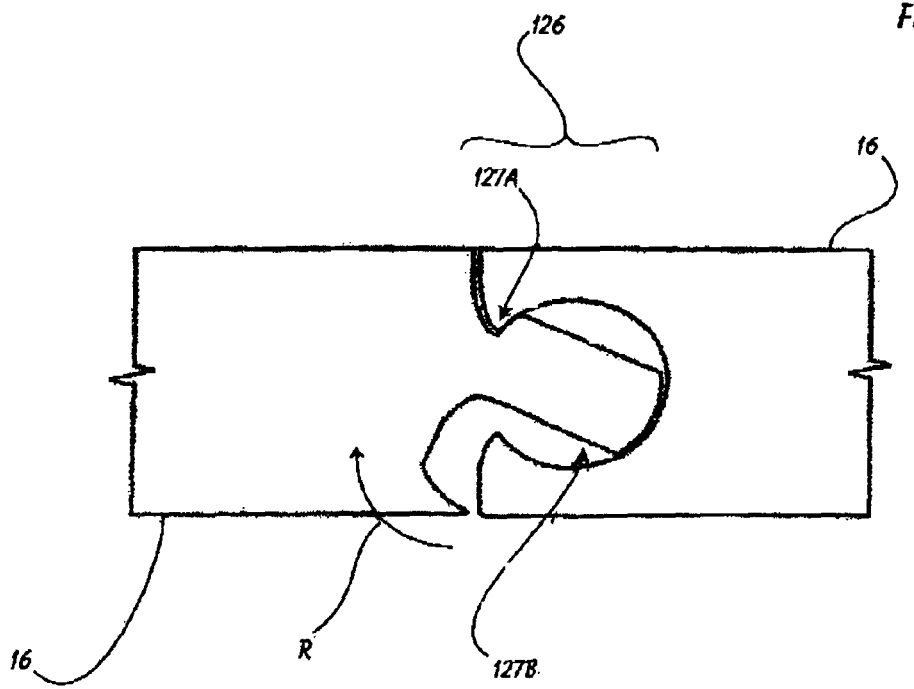

FIGS. 6A and 6B are cutaway side views of the deck segments 16 of FIGS. 2-5. The male edge 114 of each deck segment has a knuckle 117 extending from it. In actuality, to aide in the molding process (to avoid the need for "slides"), the knuckle 117 is actually staggered along the transverse width of the edge 114 (somewhat like a hinge), with alternating sections of the edge 114 looking exactly like depicted here, and the other alternating sections having a flat top surface. As can be clearly seen from FIG. 3 above, the female edge 112 is cooperatively designed such that this alternating hinge-like design is mirrored by the female edge 112.

The knuckle 117 has a generally circular cross-section, but with opposing parallel flat surfaces 121 creating an angled top and bottom surface to the knuckle 117. The knuckle 117 has the same thickness between these flat surfaces 121 as the mouth 123 of the female edge 112. The mouth 123 opens to a transverse void 113 formed within the alternating sections of the female edge 112.

To engage or disengage two adjacent segments 16 to or from one another, the male-edge-sided deck segment 16 (on the left here) must be angled until the flat surfaces 121 are coplanar with the top and bottom surfaces 118 and 119, respectively of the female-edge-sided deck segment 16 (on the right here). The knuckle 117 will then pass easily through the mouth 123 and into the transverse void 113. Once in place, the male-edge-sided deck segment 16 is rotated in direction R until the top surface 118 of both segments 16 are flush with relation to one another. The shoulders 127A and 127B created at the transition in the knuckle 117 between a rounded portion and the flat surfaces 121. These shoulders 127A and 127B interact with slight lips created at the mouth of the transverse void 113 to prevent the interlocked segments 16 from being pulled apart in the longitudinal direction. The sliding rods would then be placed in the extended position to retain the top surfaces 118 segments in a flush condition.

To disassemble the interlocked hinge 126 (although it is not intended to operate like a hinge in normal conditions, only when assembling/disassembling the deck), the slidable rods are placed in the stowed position, allowing the panel on the left in this FIG. 6B to be rotated counter-clockwise until the flat surfaces 121 are aligned and parallel with the top and bottom surface 118, 119 of the segments 16. The segments 16 can now be pulled apart.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A collapsible trailer, comprising:
   a deck comprising three interlocked deck segments, each said deck segment comprising a female interlocking edge defining a cross-section having a generally circular central bore void and a male interlocking edge opposed thereto, said female and male interlocking edges cooperating to be interlockable one with another of an adjacent segment whereby portions of said male edge are inserted into said central bore void, each said deck segment defined by a longitudinal bore formed within said segment, said deck further comprising two slidable rods, each rod extending between a pair of said longitudinal bores in adjacent segments;
   a suspension assembly attached to a bottom side of at least one said deck segment; and
   a hitch strut extending forward from said deck.

2. The trailer of claim 1, wherein said deck comprises three interlocked segment assemblies, each said assembly comprising one said deck segment and a pair of said slidable rods slidingly engaging a pair of said longitudinal rod bores formed in said deck segments.

3. The trailer of claim 2, wherein each said deck segment comprises opposing side edges, one said rod bore is formed to run longitudinally along each said opposing side edge.

4. The trailer of claim 3, wherein each said rod bore defines a leading end and a trailing end, said side edges further being defined by a slot formed therein to reach said rod bore at both said leading and said trailing end.

5. The trailer of claim 4, wherein said leading end slot terminates in a handle pocket formed therein.

6. The trailer of claim 5, wherein each said slidable rod further comprises an actuating handle extending therefrom, said handle pockets formed in said side edges of said segments cooperatively configured to accept said actuating handles therein.

7. The trailer of claim 6, wherein said deck defines a leading edge and a trailing edge, said trailer further comprising a hitch adapter attached to said leading edge, said hitch adapter comprising a receiver socket formed therein.

8. The trailer of claim 7, further comprising a lighting adapter attached to said trailing edge, said lighting adapter further comprising trailer lamps displayed therefrom.

9. The trailer of claim 8, wherein said receiver socket of said hitch adapter is configured to accept said hitch strut therein.

10. The trailer of claim 9, wherein said male edge defines a cross-section having a generally circular knuckle appendage.

11. The trailer of claim 10, wherein said generally circular knuckle appendage defines an axis that is aligned transverse to said longitudinal bore.

12. The trailer of claim 11, wherein said generally circular appendage further has generally parallel opposing faces.

13. The trailer of claim 12, wherein said central bore void is accessed through a mouth, said mouth defining a gap, said gap being equal to or slightly greater than a distance between said circular knuckle appendage generally parallel opposing faces.

14. A horizontal load-bearing structure, comprising:
   a plurality of interlocked deck segment elements, each said deck segment element comprising:
      a flat shape defining a front female edge, a rear male edge opposing said female edge, said male edge defining a cross-section having a generally circular knuckle appendage, and a pair of opposing side edges perpendicular to said front and rear edges;

a pair of bores formed in close proximity to said opposing side edges of said deck segment elements, said bores oriented parallel to said opposing side edges;

whereby said male edge and said female edge are cooperatively configured such that said male edge inserts into said female edge to form an interlocked hinge between a pair of said interlocked deck segment elements and said structure further comprises a plurality of slidable rods housed in said bores and extending between adjacent said interlocked deck segment elements.

15. The structure of claim 14, wherein each said side edge comprises a longitudinal bore formed therein along said edge, each said deck segment element further comprising an elongate rod slidably inserted into said longitudinal bore and extending substantially from said male edge to said female edge.

16. The structure of claim 15, wherein said male edge is defined by an alternating knuckle structure, said knuckle structure having a generally circular shape but further defining flat transverse surfaces on opposing sides of said circular shape.

17. The structure of claim 16, wherein each said deck segment element defines a top surface in spaced parallel relation with a bottom surface, said top and bottom surfaces defining a horizontal deck plane, said flat transverse surface lying in the same horizontal plane as said top and bottom surfaces in a transverse direction, and lying in a different plane than said horizontal plane in a longitudinal direction.

18. The structure of claim 16, wherein said female edge is defined by a transverse void across substantially its entire width, said transverse void accessible through a mouth formed by said female edge, said male edge insertable into said transverse void through said mouth.

19. The structure of claim 18, wherein said flat surfaces are separated by a first distance, and said mouth having lips separated by a second distance, said first distance being slightly less than said second distance.

20. A collapsible trailer, comprising:

a deck comprising at least two interlocked deck segments, each said deck segment comprising a female interlocking edge defining a cross-section having a generally circular central bore void and a male interlocking edge opposed thereto, said male edge defining a cross-section having a generally circular knuckle appendage, said female and male interlocking edges cooperating to be interlockable one with another of an adjacent segment whereby portions of said male edge are inserted into said central bore void, each said deck segment defined by a longitudinal bore formed within said segment, said deck further comprising at least one slidable rod, each said rod extending between a pair of said longitudinal bores in said interlocked segments;

a suspension assembly attached to a bottom side of at least one said deck segment; and a hitch strut extending forward from said deck.

* * * * *